United States Patent Office 3,150,127
Patented Sept. 22, 1964

3,150,127
PREPARATION OF 11β-HYDROXY-19-NOR-TESTOSTERONE
Gérard Nominé, Noisy-le-Sec, and Robert Bucourt, Clichy-sous-Bois, France, assignors to Roussel-UCLAF, S.A., Paris, France, a corporation of France
No Drawing. Filed Oct. 23, 1962, Ser. No. 232,699
Claims priority, application France, Oct. 28, 1961, 877,340
9 Claims. (Cl. 260—239.55)

The invention relates to a novel process for the preparation of 11β-hydroxy-19-nor-testosterone and novel intermediates thereof.

Up to the present time, 11β-hydroxy-19-nor-testosterone has been prepared only by microbiological means or by difficult reaction routes starting from $\Delta^{1,4,17(20)}$-pregnatriene-11β,21-diol-3-one (Magerlein et al., J.A.C.S., vol. 79, 1957, p. 1508). We have now found a process for the preparation of 11β-hydroxy-19-nor-testosterone starting from the 10-11 lactones of 17-OR-$\Delta^4$-estrene-11β-ol-3-one-10β-carboxylic acid wherein R is selected from the group consisting of hydrogen and an acyl radical of a hydrocarbon carboxylic acid having 1 to 7 carbon atoms.

It is an object of the invention to provide a novel process for the preparation of 11β-hydroxy-19-nor-testosterone.

It is another object of the invention to provide novel intermediates for 11β-hydroxy-19-nor-testosterone.

These and other objects and advantages of the invention will become obvious from the following detailed description.

The process of the invention for the preparation of 11β-hydroxy-19-nor-testosterone comprises reacting the 10-11 lactone of 17β-OR-$\Delta^4$-estrene-11β-ol-3-one-10β-carboxylic acid with a ketalizing agent to form the 10-11 lactone of 3-lower alkylenedioxy-17β-OR-$\Delta^5$-estrene-11β-ol-10β-carboxylic acid wherein R is selected from the group consisting of hydrogen and an acyl radical of a hydrocarbon carboxylic acid having 1 to 7 carbon atoms, reducing the latter with an alkaline reducing agent to form 3-lower alkylene-dioxy-$\Delta^5$-androstene-11β,17β,19-triol, hydrolyzing the latter under acidic conditions to form $\Delta^4$-androstene-11β,17β,19-triol-3-one, subjecting the latter to alkaline degradation to form 11β-hydroxy-19-nor-testosterone and recovering the latter.

A preferred mode of the process of the invention comprises reacting the 10-11 lactone of 17β-OR-$\Delta^4$-estrene-11β-ol-3-one-10β-carboxylic acid wherein R is selected from the group consisting of hydrogen and an acyl radical of a hydrocarbon carboxylic acid having 1 to 7 carbon atoms with methyl ethyl dioxolane in the presence of p-toluene sulfonic acid to form the 10-11 lactone of 3-ethylenedioxy-17β-OR-$\Delta^5$-estrene-11β-ol-10β-carboxylic acid, reducing the latter with an alkaline reducing agent selected from the group consisting of an alkali metal borohydride and lithium aluminum hydride to form 3-ethylenedioxy-$\Delta^5$-androstene-11β,17β,19-triol, hydrolyzing the latter under acidic conditions to form $\Delta^4$-androstene-11β,17β,19-triol-3-one, reacting the latter with an aqueous alkali metal hydroxide such as potassium hydroxide to form 11β-hydroxy-19-nor-testosterone and recovering the latter. The reaction scheme is illustrated in Table I.

TABLE I

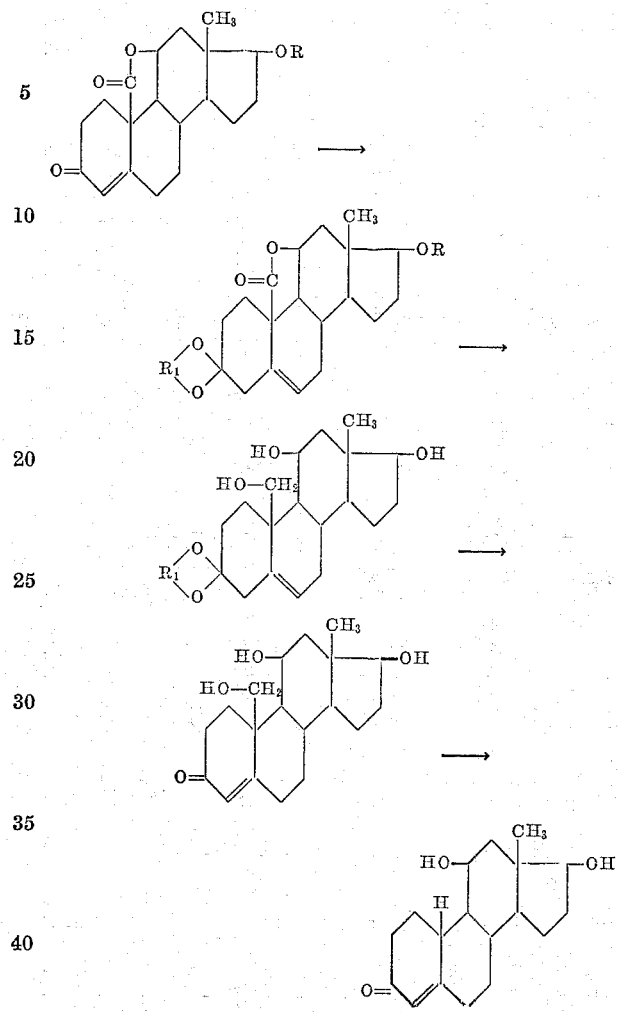

wherein R is selected from the group consisting of hydrogen and an acyl radical of a hydrocarbon carboxylic acid having 1 to 7 carbon atoms and $R_1$ is a lower alkylene radical.

The reduction of the 10-11 lactone of 3-lower alkylenedioxy-17β-OR-$\Delta^5$-estrene-11β-ol - 10β - carboxylic acid to 3-lower alkylenedioxy-$\Delta^5$-androstene-11β,17β,19-triol is effected with an alkaline hydride. If the 17β-OR grouping is an acyloxy group, lithium aluminum hydride and reflux temperatures are used to obtain the desired reduction and the simultaneous saponification of the 17β-acyloxy group to the free alcohol. If the 17β-OR grouping is a hydroxy group, an alkali metal borohydride such as potassium or lithium borohydride and normal temperatures are used to effect the desired reduction.

The acyl radical of the hydrocarbon carboxylic acid having 1 to 7 carbon atoms can be derived from aliphatic acids such as acetic acid, propionic acid, butyric acid, isobutyric acid, valeric acid, isovaleric acid, etc., and aromatic acids such as benzoic acid.

The starting materials for the process of the invention, namely the 10-11 lactones of 17β-OR-$\Delta^4$-estrene-11β-ol- 3-one-10β-carboxylic acids, may be prepared according to the process described in our commonly assigned United States Patent application Serial No. 232,569, filed on even date herewith. The said process comprises reacting a 5-lower alkylene-dioxy-9α,11α-epoxy-17β-acyloxy-des A-estrane wherein the acyl radical is derived from a hydrocarbon carboxylic acid having 1 to 7 carbon atoms with formic acid to form 17β-acyloxy-des A-estrane-5,11-dione, reacting the latter with a ketalizing agent to form 5-lower alkylenedioxy-17β-acyloxy-des A-estrane-11-one, reducing the latter with an alkaline hydride to form 5-lower alkylenedioxy-17β-OR-des A-estrane-11β-ol wherein R has the above definition, hydrolyzing the latter under acidic conditions to form 17β-OR-des A-estrane-11β-ol-5-one, reacting the latter to form the 10-11 lactone of 17β-OR-des A-estrane-11β-ol-5-one-10β-carboxylic acid, condensing the latter with methyl vinyl ketone in the presence of an alkaline condensing agent to form the 10-11 lactone of 17β-OR-4,5-seco-estrane-11β-ol-3,5-dione-10β-carboxylic acid, reacting the latter with a secondary amine to form a mixture of the 10-11 lactone of 3-enamino-17β-OR-Δ$^{3,5}$-estradiene-11β-ol-10β-carboxylic acid and the 10-11 lactone of 3-enamino-17β-OR-Δ$^3$-estrene-5,11β-diol-10β-carboxylic acid, hydrolyzing the latter under acidic conditions to form the 10-11 lactone of 17β-OR-Δ$^4$-estrene-11β-ol-3-one-10β-carboxylic acid and recovering the latter.

In the following examples there are described several preferred embodiments to illustrate the invention. However, it should be understood that the invention is not intended to be limited to the specific embodiments.

EXAMPLE I

Preparation of 11β-Hydroxy-19-Nor-Testosterone

STEP A.—THE 10-11 LACTONE OF 3-ETHYLENEDIOXY-17β-BENZOYLOXY-Δ$^5$-ESTRENE-11β-OL-10β-CARBOXYLIC ACID 2.356 gm. of the 10-11 lactone of 17β-benzoyloxy-Δ$^4$-estrene-11β-ol-3-one-10β-carboxylic acid, prepared according to the process of applicants' copending, commonly assigned United States patent application Serial No. 232,569, filed on even date herewith, were introduced into 25 cc. of anhydrous benzene. 25 cc. of methyl ethyl dioxolane and 70 mgm. of p-toluene sulfonic acid were added and the reaction mixture was agitated at room temperature for a period of 24 hours. Then 50 cc. of benzene were added and the reaction mixture was washed successively with water saturated with sodium bicarbonate, then with pure water, dried and evaporated to dryness under vacuum. The residue was crystallized from ethyl acetate and supplied 1.811 g. of the 10-11 lactone of 3-ethylenedioxy-17β-benzoyloxy-Δ$^5$-estrene-11β-ol-10β-carboxylic acid having a melting point of 246° C. and a specific rotation $[\alpha]_D^{20}$=+23° (c.=1% in tetrahydrofuran). The product occurred in the form of white crystals, and was soluble in benzene and chloroform and in hot acetone, and insoluble in water.

This compound is not described in the literature.

STEP B.—3-ETHYLENEDIOXY-Δ$^5$-ANDROSTENE-11β,17β,19-TRIOL 500 mgm. of the 10-11 lactone of 3-ethylenedioxy-17β-benzoyloxy-Δ$^5$-estrene-11β-ol-10β-carboxylic acid were introduced into 10 cc. of tetrahydrofuran. 750 mgm. of lithium-aluminum hydride were added and the reaction mixture was heated to reflux for a period of 3 hours. After cooling, 150 cc. of tetrahydrofuran were added. The resulting solution was washed with a solution of 7.5 g. of the double tartarate of sodium and potassium in 75 cc. of water saturated with sodium bicarbonate, then with bicarbonated water, dried and evaporated to dryness under vacuum. The residue was crystallized from isopropyl ether and supplied 355 mg. (90.5% yield) of 3-ethylenedioxy-Δ$^5$-androstene-11β,17β,19-triol having a melting point of 215° C. and a specific rotation $[\alpha]_D^{20}$=+1.8° (c.=1% in tetrahydrofuran). The product occurred in the form of white crystals and was soluble in hot acetone and insoluble in water.

This compound is not described in the literature.

STEP C.—11β-HYDROXY-19-NOR-TESTOSTERONE

The 3-ethylenedioxy-Δ$^5$-androstene-11β,17β,19-triol prepared in Step B was dissolved in an aqueous acetic acid solution and heated to 60° C. for two hours. By neutralisation with sodium bicarbonate, then extraction by means of methylene chloride, Δ$^4$-androstene-11β,17β,19-triol-3-one in amorphous solid form was obtained.

The Δ$^4$-androstene-11β,17β,19-triol-3-one in ethanol was added to an aqueous potassium hydroxide solution at room temperature and held there for 3 hours to obtain 11β-hydroxy-19-nor-testosterone which upon purification had a melting point of 224–227° C. and a specific rotation $[\alpha]_D^{20}$=92° (c.=0.36% CH$_2$OH).

EXAMPLE II

Preparation of 11β-Hydroxy-19-Nor-Testosterone

STEP A.—THE 10-11 LACTONE OF 3-ETHYLENEDIOXY-Δ$^5$-ESTRENE-11β,17β-DIOL-10β-CARBOXYLIC ACID 3.70 gm. of the 10-11 lactone of Δ$^4$-estrene-11β,17β-diol-3-one-10β-carboxylic acid, prepared according to the process described in applicants' copending, commonly assigned United States patent application Serial No. 232,569, filed on even date herewith, were introduced under agitation and in an atmosphere of nitrogen into 100 cc. of anhydrous benzene. 100 cc. of a solution containing 2.5% of ethylene glycol in methyl ethyl dioxolane were added. Next, 115 mgm. of p-toluene sulfonic acid were introduced and the reaction mixture was agitated at room temperature for a period of 5 hours. Then 500 cc. of ether, 300 cc. of methylene chloride and 10 cc. of methanol were added. The reaction mixture was alkalinized by the addition of sodium bicarbonate and was then extracted with 100 cc. of methylene chloride. The extracts were combined with the organic phase and evaporated to dryness under vacuum, and the residue was recrystallized from isopropyl ether.

2.62 g. (62% yield) of the 10-11 lactone of 3-ethylenedioxy-Δ$^5$-estrene-11β,17β-diol-10β-carboxylic acid were recovered. The product had a melting point of 220° C. and a specific rotation $[\alpha]_D^{20}$=+28.3°±1° (c.=44% in methanol).

The product occurred in the form of crystals which were soluble in alcohol, ether, acetone, benzene, chloroform, methanol and ethanol, and insoluble in water.

Analysis.—$C_{21}H_{28}O_5$: molecular weight=360.43. Calculated: C, 69.9%; H, 7.8%. Found: C, 69.6%; H, 7.7%.

This compound is not described in the literature.

STEP B.—3-ETHYLENEDIOXY-Δ$^5$-ANDROSTENE-11β,17β,19-TRIOL

A suspension of 300 mgm. of lithium borohydride in 20 cc. of tetrahydrofuran was added to a solution of 1.13 g. of the 10-11 lactone of 3-ethylenedioxy-Δ$^5$-estrene-11β,17β-diol-10β-carboxylic acid in 15 cc. of tetrahydrofuran. The reaction mixture was allowed to stand at room temperature for a period of 40 hours. Next 50 cc. of anhydrous ether, then 10 cc. of a mixture of 25 gm. of the double tartarate of potassium and sodium in 50 cc. of a saturated solution of sodium bicarbonate were added. The organic phase was decanted, washed with water, dried over sodium sulfate and evaporated to dryness under vacuum.

The product obtained was crystallized from isopropyl ether. The mixture was iced and 1.015 g. (86.6% yield) of 3-ethylenedioxy-Δ$^5$-androstene-11β,17β,19-triol were obtained. The product had a melting point of 215° C. and a specific rotation $[\alpha]_D^{20}$=+1.8° (c.=1% in tetrahydrofuran). The mother liquors supplied another 17 mgm.

The product occurred in the form of white crystals and was soluble in hot acetone and insoluble in water.

STEP C.—11β-HYDROXY-19-NOR-TESTOSTERONE

Using the procedure of Step C of Example I, there was obtained from 3-ethylenedioxy-Δ⁵-androstene-11β,17β,19-triol first Δ⁴-androstene-11β,17β,19-triol-3-one and then 11β-hydroxy-19-nor-testosterone.

Various modifications of the process of the invention may be made without departing from the spirit or scope thereof and it is to be understood that the invention is to be limited only as defined in the appended claims.

We claim:
1. A compound having the formula

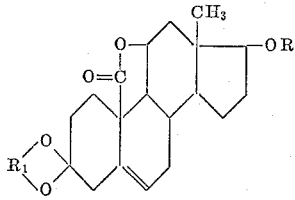

wherein R is selected from the group consisting of hydrogen and an acyl radical of a hydrocarbon carboxylic acid having 1 to 7 carbon atoms and $R_1$ is a lower alkylene radical.

2. The 10-11 lactone of 3-ethylenedioxy-17β-benzoyloxy-Δ⁵-estrene-11β-ol-10β-carboxylic acid.

3. The 10-11 lactone of 3-ethylenedioxy-Δ⁵-estrene-11β,17β-diol-10β-carboxylic acid.

4. A compound having the formula

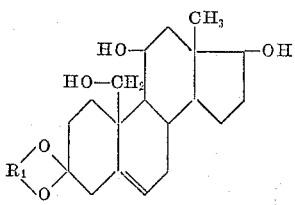

wherein $R_1$ is a lower alkylene radical.

5. 3-ethylenedioxy-Δ⁵-androstene-11β,17β,19-triol.
6. Δ⁴-androstene-11β,17β,19-triol-3-one.
7. A process for the preparation of 11β-hydroxy-19-nor-testosterone which comprises reacting the 10-11 lactone of 17β-OR-Δ⁴-estrene-11β-ol-3-one-10β-carboxylic acid with a ketalizing agent to form the 10-11 lactone of 3-lower alkylenedioxy-17β-OR-Δ⁵-estrene-11β-ol-10β-carboxylic acid wherein R is selected from the group consisting of hydrogen and an acyl radical of a hydrocarbon carboxylic acid having 1 to 7 carbon atoms, reducing the latter with an alkaline mixed hydride to form 3-lower alkylenedioxy-Δ⁵-androstene-11β,17β,19-triol, hydrolyzing the latter under acidic conditions to form Δ⁴-androstene-11β,17β,19-triol-3-one, subjecting the latter to alkaline degradation with an alkali metal hydroxide to form 11β-hydroxy-19-nor-testosterone and recovering the latter.

8. A process for the preparation of 11β-hydroxy-19-nor-testosterone which comprises reacting the 10-11 lactone of Δ⁴-estrene-11β,17β-diol-3-one-10β-carboxylic acid with methyl ethyl dioxolane to form the 10-11 lactone of 3 - ethylenedioxy - Δ⁵ - estrene - 11β,17β - diol - 10β-carboxylic acid, reacting the latter with an alkali metal borohydride to form 3-ethylenedioxy-Δ⁵-androstene-11β,17β,19-triol, hydrolyzing the latter under acidic conditions to form Δ⁴-androstene-11β,17β,19-triol-3-one, subjecting the latter to alkaline degradation with an alkali metal hydroxide to form 11β-hydroxy-19-nor-testosterone and recovering the latter.

9. A process for the preparation of 11β-hydroxy-19-nor-testosterone which comprises reacting the 10-11 lactone of 17β-benzoyloxy-Δ⁴-estrene-11β-ol-3-one-10β-carboxylic acid with methyl ethyl dioxolane to form the 10-11 lactone of 3-ethylenedioxy-17β-benzoyloxy-Δ⁵-estrene-11β-ol-10β-carboxylic acid, reducing the latter with lithium aluminum hydride at reflux temperatures to form 3-ethylenedioxy-Δ⁵-androstene-11β,17β,19-triol, hydrolyzing the latter under acidic conditions to form Δ⁴-androstene-11β,17β,19-triol-3-one, subjecting the latter to alkaline degradation with an alkali metal hydroxide to form 11β-hydroxy-19-nor-testosterone and recovering the latter.

References Cited in the file of this patent
UNITED STATES PATENTS

| | | |
|---|---|---|
| 3,006,931 | Nishikawa et al. | Oct. 31, 1961 |
| 3,013,025 | Zaffaroni | Dec. 12, 1961 |
| 3,077,482 | Wettstein et al. | Feb. 12, 1963 |